April 23, 1935. L. P. PLAS 1,998,966
SCATTERING MACHINE FOR ROAD MAKING MATERIAL
Filed Sept. 4, 1931 3 Sheets-Sheet 1
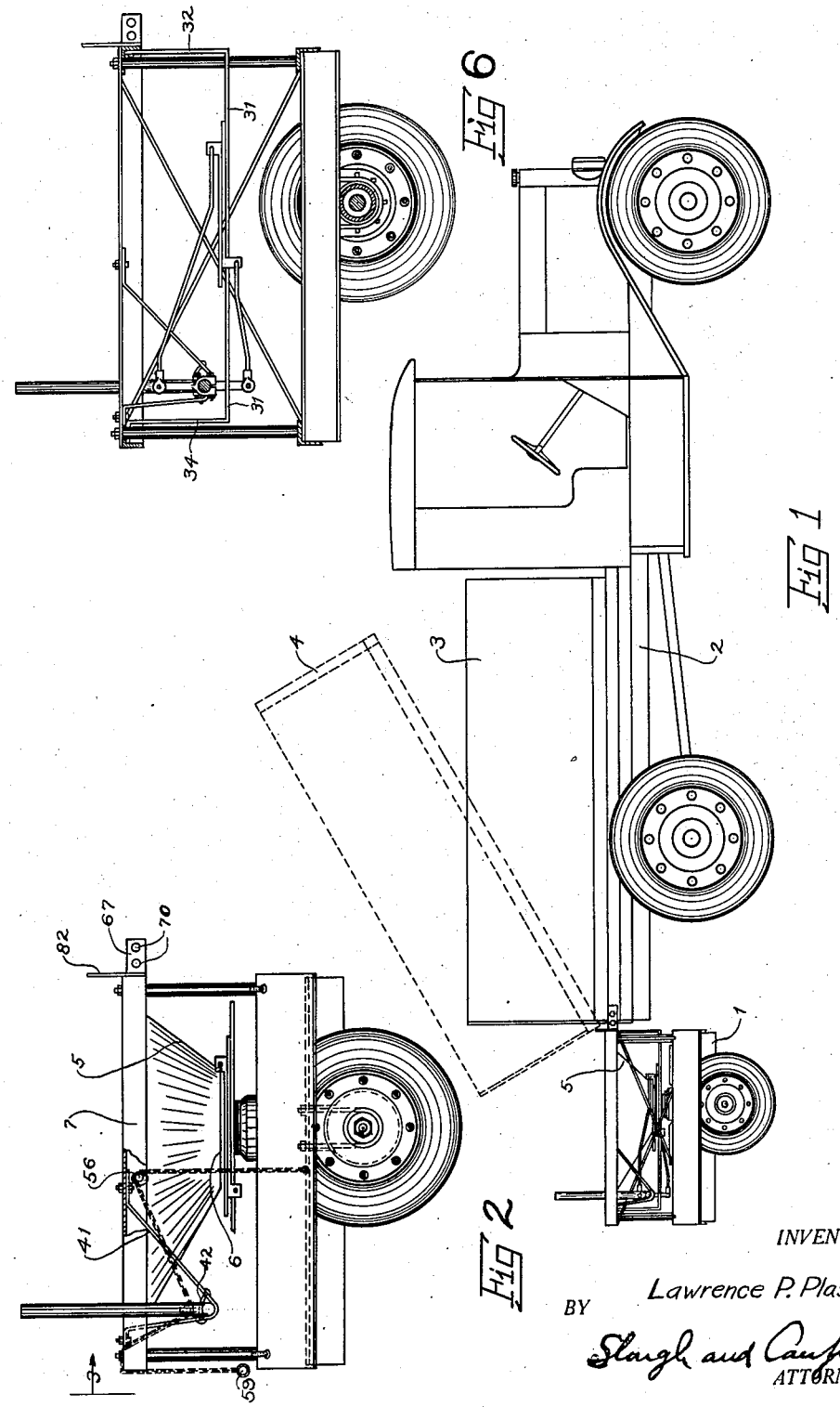
INVENTOR.
Lawrence P. Plas.
BY
*Slaugh and Canfield*
ATTORNEY.

April 23, 1935.  L. P. PLAS  1,998,966
SCATTERING MACHINE FOR ROAD MAKING MATERIAL
Filed Sept. 4, 1931  3 Sheets-Sheet 2
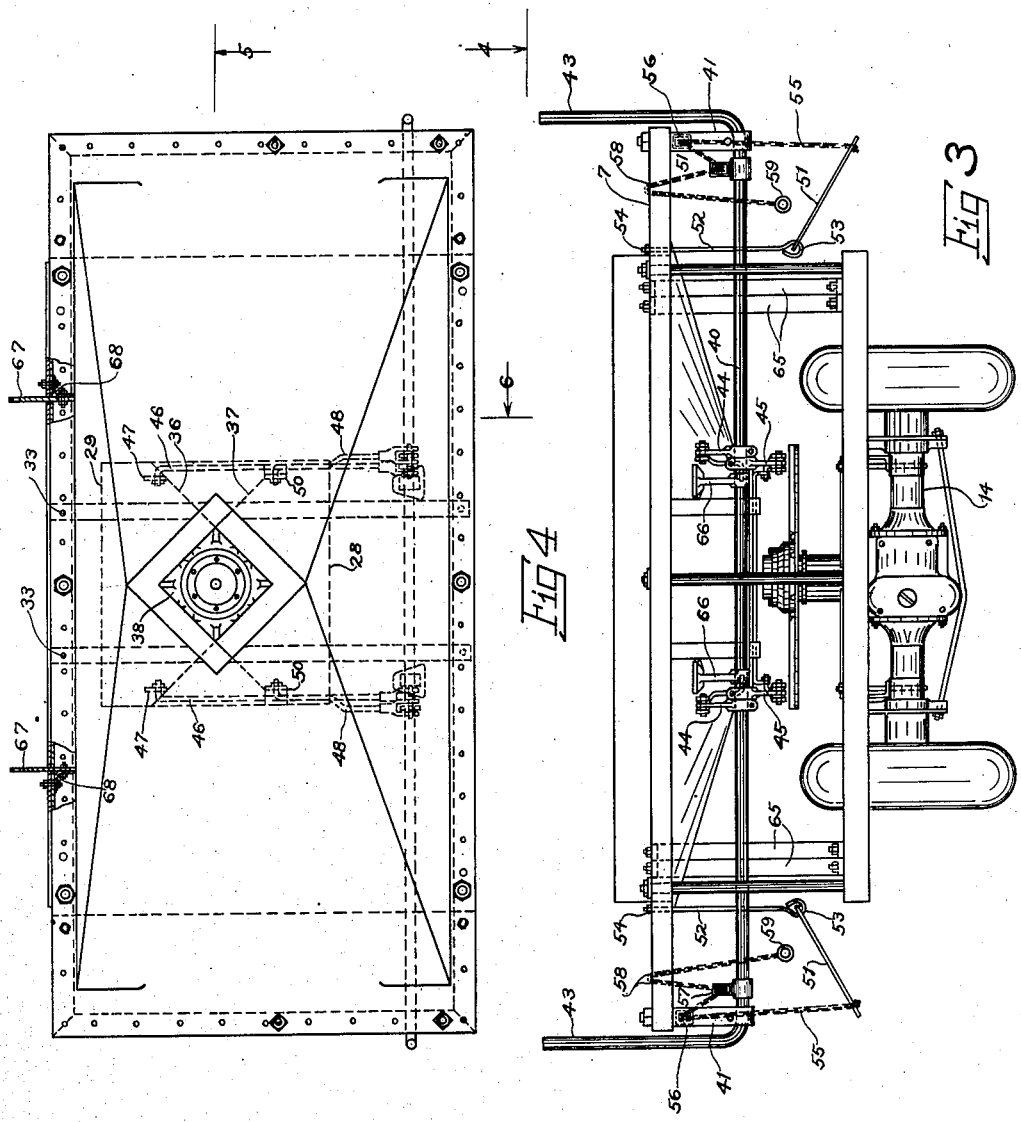
INVENTOR.
Lawrence P. Plas
BY
Slaugh and Canfield
ATTORNEY.

April 23, 1935. L. P. PLAS 1,998,966
SCATTERING MACHINE FOR ROAD MAKING MATERIAL
Filed Sept. 4, 1931 3 Sheets-Sheet 3
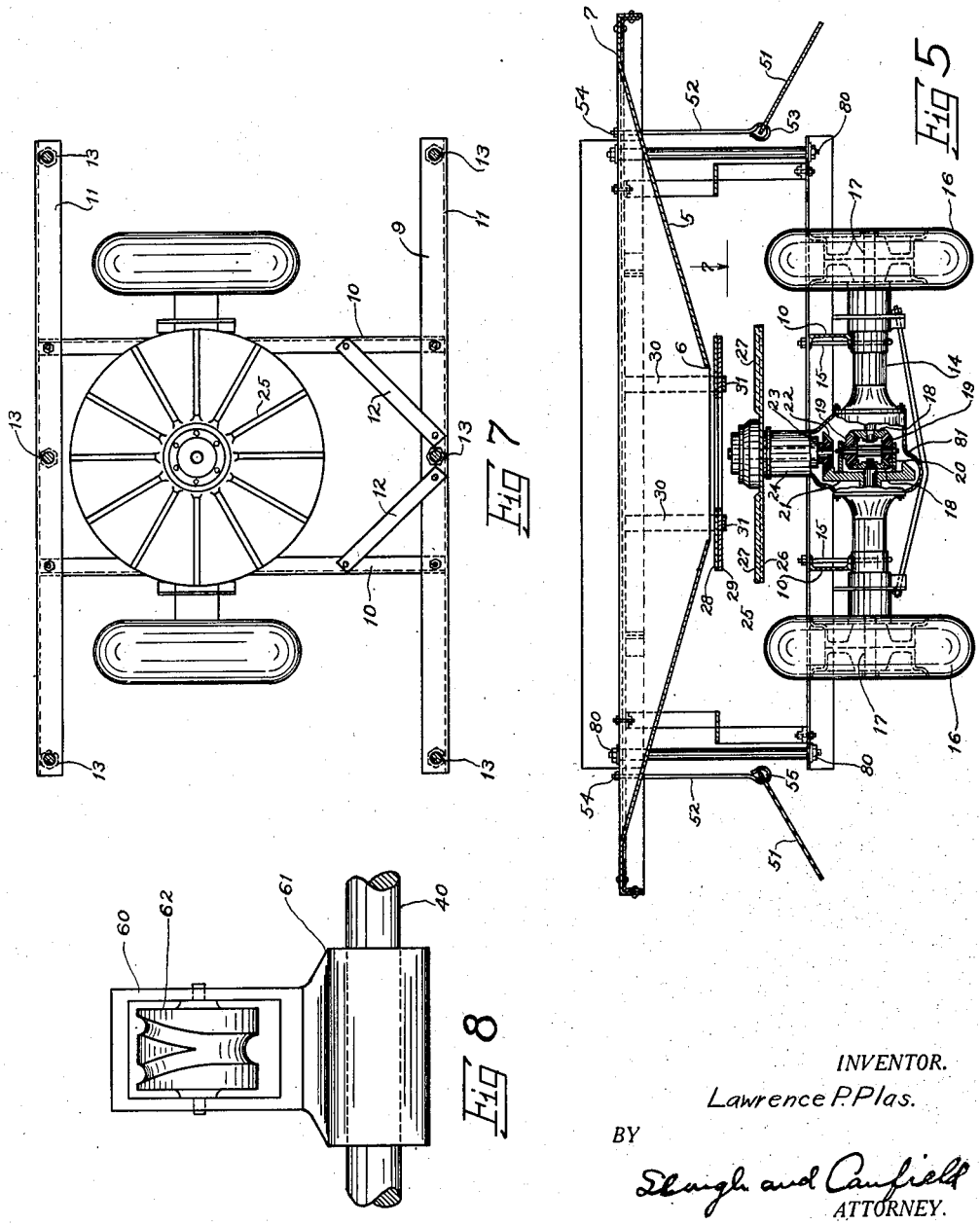
INVENTOR.
Lawrence P. Plas.
BY
Slough and Canfield
ATTORNEY.

Patented Apr. 23, 1935

1,998,966

UNITED STATES PATENT OFFICE 1,998,966

SCATTERING MACHINE FOR ROAD MAKING MATERIAL

Lawrence P. Plas, Elyria, Ohio, assignor to The Plas Construction Company, Elyria, Ohio, a corporation of Ohio Application September 4, 1931, Serial No. 561,129

13 Claims. (Cl. 275—8)

This invention relates to scattering unloaders and particularly to machines for scattering road making or repairing material.

My invention may be embodied in various types of machines but I have chosen to illustrate and describe it herein as embodied in a scattering machine of the vehicle trailer type.

In the art of road making, so-called "screenings" or "chips", gravel, and like materials are scattered over the surface during the construction of the road, or scattered over the surface when the road is being repaired.

Heretofore machines for scattering such material have been proposed, constructed in the form of a trailer adapted to be hitched to the rear part of a supply truck, and comprising a scattering mechanism operated by power from the ground supporting wheels of the trailer, and provided with a hopper adapted to be continuously supplied with material from the dump or other body of the truck.

Difficulties however have been encountered with such machines which have rendered them inefficient and troublesome in operation and which have resulted in unequal distribution or scattering of the material, and in some instances have resulted in mutilation of the rolled prepared bed upon which the material is being scattered.

For example, in those machines in which the scattering mechanism is driven by power from two or more ground wheels, the rate of scattering is affected by curvature of the road, being different on curved portions than on straightaway portions. Again, where the road is under construction, and the screenings or the like are being scattered on a bed composed of loose stones, one or the other of the wheels, due to unequalized tractive effort, will tend to dig into the loose stones and raise them above the rolled surface thereof, mutilating the same and destroying the smoothed rolled surface thereof.

It has been found that large pneumatic tires of the so-called balloon type, afford the best type of traction for the wheels of such trailers, since such tires give the maximum of tractive effort to drive the scattering mechanism and at the same time ride over the loose prepared bed upon which the screenings or the like are being scattered with the least tendency to mutilate or disturb the bed. But when such wheels are employed, and the trailer is drawn on a curving portion of the road, the tendency of one wheel to rotate faster than the other produces an excessive amount of multilation or digging up of the prepared bed by such tires.

The effort has been made in some instances to overcome some of these difficulties by supporting the trailer on a single wheel and driving the scattering mechanism therefrom; but because of the desirability of supplying the trailer hopper from the main truck it is necessary to dispose the hopper near to the ground and thus a wheel of small diameter only may be employed, because as is obvious, a single wheel must preferably be disposed directly under the hopper.

Such single wheel trailers introduce other difficulties such as that of balancing the hopper when loaded, but a more important defect is that such wheels being of small diameter have a magnified tendency to gouge into the prepared loose bed and mutilate it by digging up loose material thereof.

It is therefore one of the objects of this invention to provide an improved scatterer for road making material which will be efficient in operation and in which the foreging objections to prior types may be eliminated.

Another object is to provide a material scatterer having a scattering mechanism driven from a pair of supporting ground wheels through a suitable mechanism, such for example as a differential mechanism whereby the driving effort of both ground wheels may be effective at different rotational rates of the wheels.

Another object is to provide a material scatterer of the trailer type supported on a pair of spaced ground wheels and having a scattering mechanism driven from both wheels in an improved manner.

Another object is to provide a material scattering machine of the vehicle type having a scattering mechanism driven from ground wheels and provided with improved means for regulating the supply of material to the mechanism.

Another object is to provide a road material scattering machine having improved means for preventing throw of the material laterally beyond certain predetermined limits.

Another object is to provide a road material scattering machine comprising a hopper and a scattering mechanism and having improved means for controlling and/or adjusting the rate of flow of material from the hopper to the scattering mechanism.

Other objects will be apparent to those skilled in the art to which my invention appertains.

My invention is fully disclosed in the following description taken in connection with the accompanying drawings in which:

Fig. 1 is a side elevational view illustrating an embodiment of my invention as applied to an automotive dump supply truck;

Fig. 2 is a separate view to a larger scale of the embodiment of Fig. 1;

Fig. 3 is a rear elevational view taken approximately from the plane 3 of Fig. 2;

Fig. 4 is a top plan view of the embodiment illustrated in Fig. 3 taken approximately from the plane 4 of Fig. 3;

Fig. 5 is a rear transverse sectional view taken approximately from the plane 5 of Fig. 4;

Fig. 6 is a longitudinal sectional view taken approximately from the plane 6 of Fig. 4;

Fig. 7 is a sectional view taken from the plane 7 of Fig. 5 with parts back of the section plane omitted for simplicity, and Fig. 8 is a separate view of a pulley device forming part of Figs. 2 and 3 and drawn to a larger scale.

Referring to the drawings, I have shown generally at 1 a trailer vehicle hitched by suitable means to be described, to an automotive truck 2. Preferably the truck 2 is of the dump body type provided with a material carrying body 3 adapted to be elevated to a sloping dumping position, indicated in dotted lines at 4, whereby material contained therein may flow rearwardly out of the body by gravity.

The trailer is provided with a hopper 5 disposed to receive material from the body 3 in its elevated position whereby the hopper 5 may be continuously supplied with material from the truck.

The hopper 5, preferably formed from sheet metal, slopes downwardly toward a central portion thereof and there is provided with a rectangular or otherwise shaped discharging mouth 6. The upper outer periphery of the hopper is secured to and supported by a rectangular frame 7, preferably formed from angle iron, to a horizontal leg of which the hopper periphery is secured as by rivets 8—8.

The hopper frame 7 is supported horizontally above and in parallel spaced relation to a chassis frame 9, shown separately in Fig. 7, and comprising a pair of spaced longitudinal channel sills 10—10 supporting at their forward and rearward ends a pair of substantially parallel transverse frame members 11—11 preferably formed from angle iron, of which a horizontal leg or flange rests upon a horizontal flange of the channels 10—10. The channels 10 and the members 11 are maintained in rectangular relation by diagonal braces connecting them as shown at 12—12.

The hopper frame 7 is supported on the chassis 9 by a plurality of spaced, generally parallel posts 13—13 provided with threaded shanks at the opposite ends thereof projected respectively through suitable holes in the angle iron frame members 11 and 7, nuts 80 being screwed on the shank portions to secure the posts and frame members together in a well known manner.

The sills 10 rest upon an axle housing 14 and are rigidly secured thereto by U-bolts 15—15, the closed ends of which embrace the axle housing and the legs of which are projected through suitable perforations in the flanges of the channels 10 and secured thereto by nuts in a well known manner, as shown in Figs. 5 and 2.

The axle housing 14 may be of any suitable or known construction such for example as that employed in the rear axle mechanism of automotive vehicles, and one form of which is illustrated in the drawings. At 16—16 I have shown a pair of wheels of the type having pneumatic tires preferably of the so-called balloon type, the wheels 16 being secured in the usual manner to axle shafts 17—17 disposed substantially coaxially and extending inwardly from the wheels 16, through the axle housing 14 and terminating inwardly as shown in Fig. 5 in a "differential housing" 81. Each of the shafts 17 is provided on its inner end with a shaft gear 18.

The shafts 17 are supported in the housing 14 upon suitable bearings whereby the load of the hopper, frame, and associated parts, transmitted to the axle housing 14 by the sills 10, may be transmitted to the wheels 16 and thence to the ground. Thereupon the vehicle is propelled in a manner to be described. The wheels 16 may support the vehicle, and each wheel may rotate independently of the other.

The gears 18 have meshed therewith one or more differential pinions 19—19 rotatably mounted upon a differential spider 20 secured to a ring gear 21 mounted to rotate on suitable bearings coaxially with the shaft 17. A pinion 22 is meshed with the ring gear 21 and is mounted on a vertically disposed shaft 23 housed in and mounted in bearings to rotate in a vertical extension 24 of the differential housing 81 on the axle housing 14.

A load or material scattering disc 25 comprising a preferably circular disc form body portion 26 provided on its upper surface with a plurality of generally radial veins or ribs 27—27 is mounted upon the shaft 23, and adapted to rotate therewith.

By the construction just described, when the vehicle is propelled, the wheels 16 rotate and transmit their movement to the shaft 23 through the differential gearing described, comprising the gears 18, 19, 21, and 22, and in a manner that will be understood each wheel 16 may transmit its movement independently of the other wheel. When the vehicle is drawn straight ahead, both wheels transmit their movement equally to the shaft 23 and scattering disc 25 and when the vehicle is drawn on a curve, one wheel will travel faster than the other and the movement of the shaft 23 will be the "differential" of the movements of the two wheels. In any instance, when one of the wheels 16 travels faster than the other its movement is not communicated to the other wheel 16, with advantageous results to be referred to.

Material in the hopper 5 discharges by gravity through the mouth 6 directly upon a pair of overlapping, juxtaposed planular valve plates 28 and 29. The plates 28 and 29 are disposed immediately below the mouth 6 so that the material in the hopper may not flow outwardly and be discharged through the narrow space between the plates 28 and 29 and the periphery of the mouth 6. The plates 28 and 29 are supported on a pair of hangers 30—30, see Fig. 6. The hangers 30—30 are preferably formed from flat bar stock and comprise horizontal portions 31—31 upon which the said plates rest, and vertically extending end portions 32 bent upwardly from the horizontal portions 31 and secured to the frame 7 as at 33—33, and provided at the other end of the horizontal portion 31 with upwardly extending end portions 34 secured to the frame 7 as at 35—35. If preferred, the connection at 35 may be made with a suitable convenient portion of the hopper.

As shown in Fig. 4, the plates 28 and 29 are generally rectangular and each provided on its edge toward the center of the hopper with a large annular notch 36 and 37 respectively, the notches overlapping and embracing therebetween a rectangular opening 38 which may be varied in size by shifting one or both of the plates 28 and 29 longitudinally of the vehicle as will be understood. To adjustably vary the size of the opening 38, I preferably adjustably shift both plates 28 and 29 by the following mechanism.

A rocker shaft 40 is disposed transversely of the vehicle under the hopper and rotatably supported in a pair of hangers 41—41, formed from bar metal, generally of V-shape and with the shaft 40 lodged in the closed end of the V. Straps 42, one of which is shown in Fig. 2, may be secured to the opposite legs of the hanger and bridge the shaft 40 to retain it in the hanger. The ends of the shaft 40 are upturned to provide a pair of levers 43—43 for manually rocking the shaft 40. A pair of bell cranks 44—44 are secured to the shaft and extend upwardly therefrom. A corresponding pair of bell cranks 45—45 are secured to the shaft and extend downwardly therefrom. Connecting rods 46 connect the bell cranks 44 with lugs 47 on the plate 29 and connecting rods 48 connect the bell cranks 45 with lugs 50 on the plate 28. It will now appear that upon rocking either one of the levers 43 in one direction or the other, the plates 28 and 29 will be slid toward or from each other to vary the size of the occluded opening 38. Preferably the stroke of the bell cranks 44 and 45 is such as to be able to vary the size of the opening from a maximum size to complete closure. Any suitable means, not shown, may be provided to guide the plates 28 and 29 in their movement on the hangers 30 to constrain them to move or reciprocate along predetermined lines.

At 51—51 I have illustrated a pair of wings preferably made from flat sheet metal hingedly supported upon an upper edge by depending hangers 52—52 having eyes 53 in their lower ends threaded through corresponding perforations in the wings 51. The upper ends of the hangers 52 are secured to the hopper frame 7 as by nuts 54—54 or like devices. The wings 51, of suitable generally vertical width, extend longitudinally of the vehicle on each side thereof, and are generally coextensive with the general frame of the vehicle.

The wings 51—51 slope downwardly outwardly and are adjustable as to angular position by means of chains 55—55 by which the outer edges of the wings may be raised or lowered. The chains 55 are secured to the wings and extend upwardly over pulleys 56 on the frame 7, then downwardly through a locking pulley 57, to be described, then upwardly through a perforation 58 in the hopper and then rearwardly and downwardly over the edge of the frame, as shown in Fig. 2, terminating in a ring 59.

The locking pulley 57 comprises a frame 60 pivotally mounted by a head 61 on the shaft 40 and containing a pulley wheel 62 having a spiral groove therein. Such pulleys are well known, being of the type often employed to control window blinds, and it is believed the construction will be clear without further illustration or description. It will now be apparent that upon pulling downwardly on the ring 59, the chain will run through the pulleys and elevate the wing 51 and upon releasing the ring 59, the chain will be locked between the pulley wheel 62 and the frame 60 to hold the wing in the elevated position. Similarly the chain may be released from the pulley wheel 62 in a well known manner to permit lowering the wing 51.

The construction thus described may be strengthened or reenforced in any suitable manner. For example, at 65—65 I have shown diagonal braces extending from the hopper frame downwardly rearwardly to the chassis. The shaft 40 may be supported against vibration and to accurately position it by supporting hangers 66—66, secured at their upper ends to the under side of the hopper and in their lower ends provided with bearings for the shaft 40.

On the forward side of the hopper frame 7 I provide a pair of hitch plates 67—67. These may be secured to the frame in any suitable manner but in the drawings, I have shown them as connected to angle pieces 68 which in turn are connected to a leg of the angle of the frame 7.

An upstanding board, preferably formed from sheet metal, 82, is provided on the forward edge of the hopper frame 7 and extends transversely of the hopper for a suitable distance, and for a purpose to be described.

The hitch plates 67 may be provided with a plurality of perforations 70—70 whereby they may be attached to corresponding hitch portions of the truck with which the trailer is employed.

The operation of my invention as above described is as follows:

The truck body 4 having been filled with the material which is to be scattered on the road, the trailer, shown generally at Fig. 1, is hitched to the rear of the truck by engaging the perforations 70—70 of the hitch plates 67 with suitable connecting elements on the main body of the truck, and preferably not associated with the dumping body 4 of the truck. The connection with the truck is made at a suitable elevation so that the frame generally of the vehicle 1 may be disposed horizontally. The levers 43 are rotated in the proper direction to close the opening 38 embraced by the sliding plates 28 and 29, and thus the mouth 6 of the hopper 5 is substantially closed against egress of material in the hopper. The dump body 4 of the truck may then be elevated to an inclined position whereupon material will flow into the hopper 5.

The truck is then driven over the rolled road surface upon which the material is to be scattered, and when it has reached the commencing point, one or the other of the levers 43 is rocked to open the opening 38 the desired amount. Material then falls out of the mouth 6 and through the opening 38 upon the disc 25, which is now being rapidly rotated by movement of the ground supporting wheels 16 transmitted thereto, through the differential gearing above described, and through the vertical rotating shaft 23. The material is thrown by centrifugal force, in connection with the vanes 27, radially from the disc 25. That part of the material which is thrown out laterally impinges upon the wings 51—51 and thereupon falls directly vertically to the ground. By suitably adjusting the position of the wings 51, the lateral limit of the thrown material may be determined. Thus, for example, when it is desired to scatter material on one-half of the roadway at a time, the wings 51 may be adjusted to limit the flow to this extent. Furthermore, the thrown material falling generally vertically from the wings 51, will be disposed along the road in a uniform layer instead of scattering promiscuously along the road at the side of the vehicle. The board 82 prevents the material from overflowing from the hopper while being supplied thereto from the bed 4.

The pneumatic tired wheels 15 are ideally adapted to grip and find traction upon the rolled surface of the loosely compacted slag or stone of which the road bed under construction is formed, and by means of the differential connection therebetween, one wheel may be rotated faster than the other as upon turns in the road. Thus, each wheel maintains driving traction with the surface and neither wheel is caused to gouge into or dig up the relatively loosely compacted stones of the road bed, so that the material is scattered thereon without mutilation of the surface which has been previously rolled to receive the material. By driving the disc 25 through a differential connection between the wheels 16, it operates at a suitable velocity, whether the road is straightaway or curved, and thus a uniform layer of material is scattered on the road at all parts whether it is straight or curved.

My invention is not limited to the exact details of construction shown and described. Various types of scattering device other than the specific disc formed device 25 may be employed, differentially driven from the ground wheels. Also other forms of valve device other than the plates 28—29 may be provided to control and adjustably vary the rate of discharge from the hopper; and baffle boards 82 of various shapes, design, and mounting may be provided to limit the lateral throw of the material.

Also other changes and modifications may be made within the scope and spirit of my invention, without sacrificing its advantages.

I claim:

1. In a road material scattering vehicle, a frame, a hopper on the frame, provided with a discharge outlet, a pair of spaced ground wheels supporting the frame, a rotary scattering device under the outlet adapted to scatter material laterally in all directions from its rotational axis, and a differential driving mechanism between the wheels and the scattering device whereby when the vehicle is propelled, the wheels may differentially drive the device.

2. In a road material scattering vehicle, a frame, a pair of spaced ground wheels supporting the frame, a hopper on the frame, provided with a discharge outlet, a rotary scattering device under the outlet, a driven shaft for the device, a pinion gear on the shaft, a ring gear meshed with the pinion gear, and a differential gear mechanism between the ring gear and the two wheels.

3. In a road material scattering vehicle, a frame, a pair of laterally spaced frame supporting ground wheels, a hopper on the frame, provided with a discharge outlet, a movable scattering device under the outlet, for throwing laterally material discharged from the hopper thereupon, a forwardly and rearwardly extending pair of baffles hingingly supported on the frame laterally of the device by spaced front and rear bearings and outwardly laterally and downwardly inclined so that material thrown laterally may impinge thereupon and be deflected downwardly and upwardly laterally to the ground and adjusting means on the frame connected to the baffles on outwardly downwardly disposed portions thereof to hingingly raise and lower the outer portions of the baffle to adjustably change the angle between the baffles and the ground.

4. In a road material scattering vehicle, a frame, a pair of laterally spaced frame supporting ground wheels, a hopper on the frame, a rotary scattering device under the hopper, rotatable on a generally vertical axis, the hopper having a discharge outlet substantially above the center of the device, a valve device between the discharge outlet and the device to control the rate of discharge of material from the hopper to the device and a differential gear transmission between the ground wheels and the rotary scattering device for rotating it at substantially constant speed to throw the material substantially uniformly during changes of direction of vehicle travel.

5. In a road material scattering vehicle, a frame, a hopper on the frame, provided with a discharge outlet, a movable scattering device under the outlet, a valve device between the discharge outlet and the device to control the rate of discharge of material from the hopper to the device, the valve device comprising a pair of mutually overlapping plates provided each with a recessed edge, the recesses combining to form an orifice, a support slidably supporting the plates and means to slide at least one of the plates relative to the other to vary the size of the orifice, said means comprising a rocker shaft disposed transversely of the vehicle, a lever for rocking the shaft, a bell crank on the shaft and a connecting rod between the bell crank and one of the plates.

6. In a road material scattering vehicle, a frame, a hopper on the frame, a rotary scattering device under the hopper supported on an upwardly extending shaft terminating below the hopper, the hopper having a discharge outlet for discharging material substantially on the center of the rotary device, a valve device between the discharge outlet and the rotary device to control the rate of discharge of material from the hopper to the device, a pair of ground supporting wheels for the frame and a differential driving mechanism between the wheels and the scattering device whereby when the vehicle is propelled the wheels may differentially drive the device.

7. The combination of a material scattering trailer vehicle and a propelling vehicle adapted to carry a supply of material to be scattered, a trailer vehicle frame, a pair of spaced ground wheels supporting the frame, means for connecting the trailer vehicle to the propelling vehicle whereby it may be propelled thereby, a movable scattering device on the frame, for scattering material laterally, a differential driving mechanism between the wheels and the scattering device whereby when the trailer vehicle is propelled the wheels may differentially drive the device, and means to direct flow of material from the propelling vehicle to and upon the scattering device.

8. In a material scattering vehicle, a frame, a pair of spaced ground wheels supporting the frame, a rotary scattering device supported on the frame to rotate on a vertical axis and provided with means to scatter material laterally in all directions from its rotational axis when rotated, a differential driving mechanism between the wheels comprising a rotary element driven differentially by the wheels and connected to the rotary scattering device to rotatably drive it.

9. In a road material scattering vehicle, a frame, a hopper on the frame provided with a discharge outlet, a movable scattering device under the outlet, a pair of spaced ground wheels supporting the frame, a differential driving mechanism between the wheels and the scattering device for differentially driving it, and the scattering device being disposed to throw material deposited thereon from the hopper through the discharge outlet, laterally over the wheels.

10. In a road material scattering vehicle, a frame, a hopper on the frame, a material scattering device under the hopper for scattering material laterally in all directions, the hopper having a discharge outlet for discharging material on the scattering device, a valve device between the discharge outlet and the scattering device to control the rate of discharge of material from the hopper to the device, a pair of ground supporting wheels for the frame and a differential driving mechanism between the wheels and the scattering device whereby when the vehicle is propelled the wheels may differentially drive the device.

11. The combination of a material scattering trailer vehicle and a propelling vehicle adapted to carry a supply of material to be scattered, a trailer vehicle frame, a pair of spaced ground wheels supporting the frame, means for connecting the trailer vehicle to the propelling vehicle, whereby it may be propelled thereby, a movable scattering device on the frame for scattering material laterally, generally horizontally, a forwardly and rearwardly extending baffle hingingly supported at longitudinally spaced portions on the frame laterally outwardly with respect to the scattering device, disposed to intercept and deflect downwardly material thrown from the scattering device, means on the frame connected to an outwardly downwardly disposed portion of the baffle adapted to be adjustably moved to adjustably raise and lower the said outer portion of the baffle to adjust its material deflecting effectiveness and means to direct flow of material from the propelling vehicle to and upon the scattering device.

12. The combination of material scattering trailer vehicle and propelling vehicle as described in claim 7 and in which the scattering device is rotatable and adapted to scatter material laterally in all directions.

13. In a material scattering vehicle, a frame, a pair of spaced ground wheels supporting the frame, a rotary scattering device supported on the frame and provided with means to scatter material laterally when rotated, a differential driving mechanism between the wheels comprising a rotary element driven differentially by the wheels and connected to the rotary scattering device to rotatably drive it, means on the frame for connecting to a material supply carrying vehicle to be propelled thereby and means to direct flow of material from the supply carrying vehicle to and upon the scattering device.

LAWRENCE P. PLAS.